(12) United States Patent
Hirotani et al.

(10) Patent No.: US 11,650,289 B2
(45) Date of Patent: May 16, 2023

(54) VEHICLE DECORATIVE COMPONENT

(71) Applicants: TOYODA GOSEI CO., LTD., Kiyosu (JP); TOPPAN INFOMEDIA CO., LTD., Tokyo (JP)

(72) Inventors: Kozo Hirotani, Kiyosu (JP); Tatsuya Otsuka, Tokyo (JP)

(73) Assignees: TOYODA GOSEI CO., LTD., Aichi-pref. (JP); TOPPAN INFOMEDIA CO., LTD., Tokyo (JP)

( * ) Notice: Subject to any disclaimer, the term of this patent is extended or adjusted under 35 U.S.C. 154(b) by 249 days.

(21) Appl. No.: 16/877,683

(22) Filed: May 19, 2020

(65) Prior Publication Data

US 2020/0371203 A1 Nov. 26, 2020

(30) Foreign Application Priority Data

May 23, 2019 (JP) .............................. JP2019-096501

(51) Int. Cl.
  *G01S 7/40* (2006.01)
  *B60R 13/00* (2006.01)
  *G01S 13/931* (2020.01)

(52) U.S. Cl.
  CPC .......... *G01S 7/4004* (2013.01); *B60R 13/005* (2013.01); *G01S 13/931* (2013.01); *G01S 7/4047* (2021.05); *G01S 2013/93271* (2020.01)

(58) Field of Classification Search
  CPC ..... B60R 13/005; G01S 13/931; G01S 7/004; G01S 7/4047; G01S 2013/93271
  See application file for complete search history.

(56) References Cited

U.S. PATENT DOCUMENTS

| 9,889,798 B1 * | 2/2018 | Cong ...................... G01S 13/66 |
| 2006/0227056 A1 * | 10/2006 | Brittingham ........... B64D 15/12 |
| | | 343/704 |

(Continued)

FOREIGN PATENT DOCUMENTS

| JP | 4813726 B2 | 11/2011 |
| JP | 2017-215242 A | 12/2017 |

(Continued)

OTHER PUBLICATIONS

Extended European search report dated Sep. 29, 2020 issued in corresponding to EP patent application No. 20172996.9.

*Primary Examiner* — Peter M Bythrow
(74) *Attorney, Agent, or Firm* — Posz Law Group, PLC

(57) ABSTRACT

A vehicle decorative component includes a decorative main body and a heating wire. The vehicle decorative component includes a design surface on the front surface in the transmission direction of electromagnetic waves. The area from the design surface to a position behind and separated from the design surface in the transmission direction is constituted by a transparent member having a transparency to electromagnetic waves. The heating wire is disposed on the rear surface of the transparent member in the transmission direction. The heating wire includes a metal lead, which generates heat when energized, and a coating portion made of plastic. The coating portion coats the lead and constitutes the outer circumferential portion of the heating wire. At least the outer circumferential portion of the coating portion is constituted by a transparent coating portion, which is made of a transparent plastic.

5 Claims, 3 Drawing Sheets

(56) References Cited

U.S. PATENT DOCUMENTS

| | | | |
|---|---|---|---|
| 2014/0138368 A1* | 5/2014 | Verstraeten | B01D 53/00 219/202 |
| 2015/0183431 A1* | 7/2015 | Nanami | B60W 30/095 701/301 |
| 2015/0344031 A1* | 12/2015 | Weisswange | B60W 30/14 701/1 |
| 2016/0171893 A1* | 6/2016 | Chen | G01S 17/931 701/300 |
| 2017/0352163 A1* | 12/2017 | Mottin | G05D 1/00 |
| 2017/0352938 A1 | 12/2017 | Okumura et al. | |
| 2018/0070411 A1* | 3/2018 | Wei | H05B 3/84 |
| 2018/0075320 A1* | 3/2018 | Zermas | G06V 20/58 |
| 2018/0121750 A1* | 5/2018 | Borkowski | G06V 10/42 |
| 2019/0232886 A1* | 8/2019 | Okumura | H01Q 1/42 |

FOREIGN PATENT DOCUMENTS

| | | |
|---|---|---|
| JP | 2018-66706 A | 4/2018 |
| WO | 2019/065165 A1 | 4/2019 |

* cited by examiner

VEHICLE DECORATIVE COMPONENT

BACKGROUND

1. Field

The present disclosure relates to a vehicle decorative component.

2. Description of Related Art

In a vehicle equipped with a millimeter wave radar device, the millimeter wave radar device transmits millimeter waves to the outside of the vehicle. The millimeter waves that hit and are reflected by an object outside the vehicle, such as a pedestrian and a leading vehicle, are received by the millimeter wave radar device. The transmitted and received millimeter waves allow for recognition of the object, detection of the distance between the vehicle and the object, and detection of the relative velocity between the vehicle and the object.

The above-described vehicle includes vehicle decorative components such as a front grille and an emblem, which are located forward of the millimeter wave radar device in the transmission direction of millimeter waves. A decorative main body of the vehicle decorative component includes a base made of a transparent plastic and a decorative layer provided on the rear surface in the transmission direction of the base. The base and the decorative layer are components with a millimeter wave transparency.

The above-described vehicle decorative component is unlikely to hinder passing of the millimeter waves transmitted by the millimeter wave radar device and the millimeter waves that have hit and been reflected by an object outside the vehicle. This allows the millimeter wave radar device to properly exert functions such as the detecting function described above. When the vehicle decorative component is irradiated with visible light from the front in the transmission direction, the visible light passes through the transparent base and is reflected by the decorative layer. Since the decorative layer is visible through the base from the front in the transmission direction of the vehicle decorative component, the decorative main body is decorated by the decorative layer. The reflection of visible light on the decorative layer occurs at a position forward of the millimeter wave radar device in the transmission direction. The millimeter wave radar device is thus concealed by the decorative layer and is difficult to see.

When snow and ice collect on the above-described vehicle decorative component, millimeter waves are attenuated, which reduces the detection performance of the millimeter wave radar device. As such, Japanese Patent No. 4813726 discloses a vehicle decorative component that includes an electrical conductor passage, which generates heat when energized and is provided at a position forward of the decorative layer in the transmission direction. When ice and snow collect on the vehicle decorative component, the heat generated by the electrical conductor passage melts the ice and snow, limiting attenuation of millimeter waves due to collected ice and snow.

The electrical conductor passage may include a typical heating wire having a metal lead, which generates heat when energized, and a coating portion, which is made of colored, for example, black plastic and coats the lead. If such a heating wire is employed as the electrical conductor passage, the following problems may occur. That is, when the vehicle decorative component is seen from the front in the transmission direction, the coating portion is visually recognized, causing the heating wire to appear wide. This may spoil the appearance of the vehicle decorative component.

Such a problem can occur not only in a vehicle equipped with a millimeter wave radar device, but also in a vehicle equipped with a device that transmits and receives electromagnetic waves to detect an outside object. Specifically, the problem can occur in any type of vehicle decorative component that is arranged forward of the device in the transmission direction of electromagnetic waves and employs a heating wire as an electrical conductor passage.

SUMMARY

An objective of the present disclosure is to provide a vehicle decorative component capable of limiting deterioration of the appearance by a heating wire.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle decorative component is provided that includes a decorative main body, a heating wire, and a design surface. The decorative main body is provided in a vehicle equipped with a device configured to transmit and receive electromagnetic waves to detect an object outside the vehicle. The decorative main body is arranged in front of the device in a transmission direction of the electromagnetic waves to decorate the vehicle and has a transparency to the electromagnetic waves. The design surface is disposed on a front surface in the transmission direction. An area from the design surface to a position behind and separated from the design surface in the transmission direction is constituted by a transparent member transparent to the electromagnetic waves. The heating wire is disposed on a rear surface of the transparent member in the transmission direction. The heating wire includes a metal lead, which generates heat when energized, and a coating portion made of plastic. The coating portion coats the lead and constitutes an outer circumferential portion of the heating wire. At least an outer circumferential portion of the coating portion is constituted by a transparent coating portion, which is made of a transparent plastic.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A vehicle decorative component according to a first embodiment will now be described with reference to FIGS. 1 to 6. In the present embodiment, the vehicle decorative component is an emblem 15.

In the following description, the direction in which the vehicle advances forward will be referred to as the front, and the reverse direction will be referred to as the rear. The vertical direction refers to the vertical direction of the vehicle, and the left-right direction refers to the vehicle width direction that matches the left-right direction when the vehicle is advancing forward. In some of the drawings, in order to make the size of each component of the emblem 15 recognizable, the scale of each component is altered as necessary.

Figure 2:
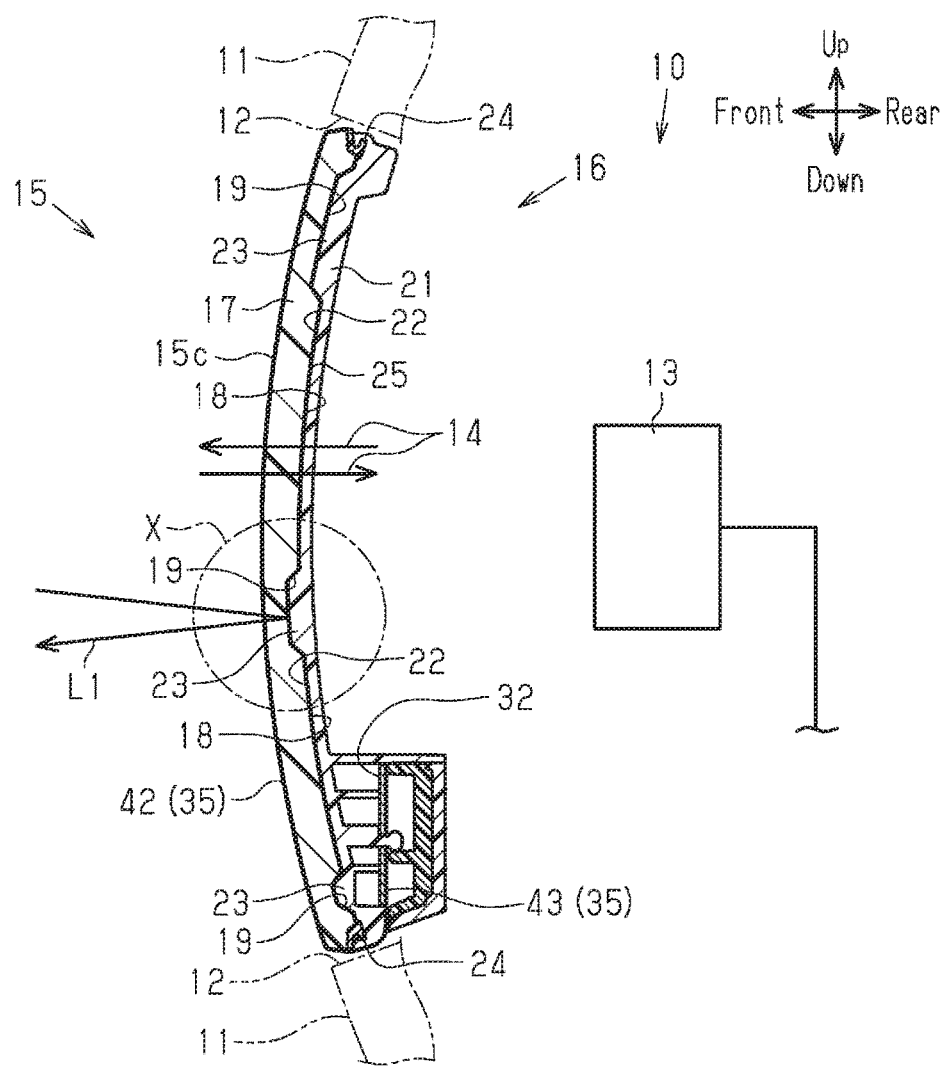
FIG. 2 is a cross-sectional view of the emblem according to the first embodiment.

As shown in FIG. 2, a vehicle 10 is equipped with a front monitoring millimeter wave radar device 13 arranged at the front. The millimeter wave radar device 13 is located at the center in the vehicle width direction and behind a front grille 11. The millimeter wave radar device 13 has a sensor function of transmitting millimeter waves 14, which are included in electromagnetic waves, to the outside of the vehicle 10, specifically, toward the front, and receiving the millimeter waves 14 that have struck and been reflected by an object outside the vehicle 10. The millimeter waves 14 are radio waves with wavelengths of 1 mm to 10 mm and frequencies of 30 GHz to 300 GHz.

Like a typical front grille, the thickness (the dimension in the front-rear direction) of the front grille 11 is uneven. The front grille 11 may include a plastic base with plating on the surface. The front grille 11 thus interferes with the transmitted or reflected millimeter waves 14. As such, the front grille 11 has a window 12, which is located forward of the millimeter wave radar device 13 in the transmission direction of the millimeter waves 14. The emblem 15, which includes a decorative main body 16 and a heating sheet 35, is disposed on the window 12. The components constituting the emblem 15 will now be described.

<Decorative Main Body 16>

Figure 1:
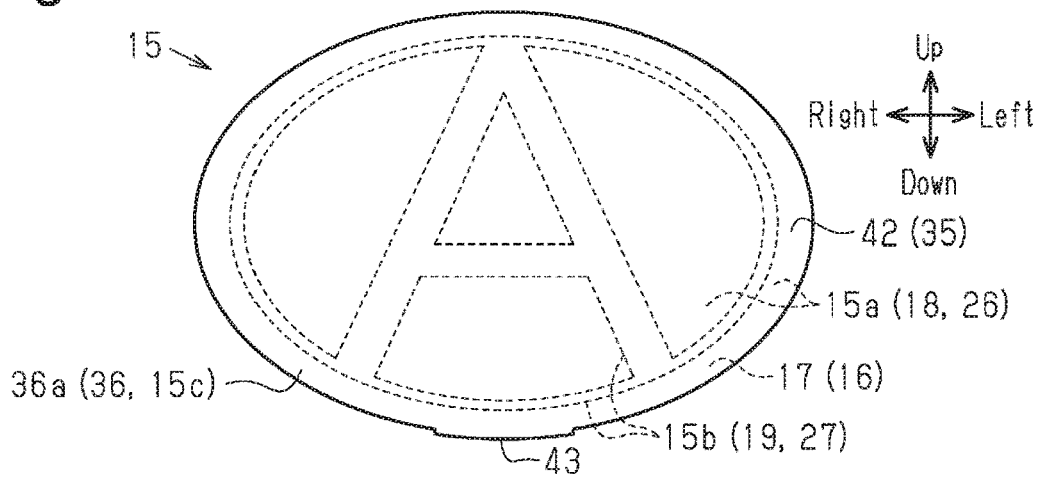
FIG. 1 is a front view of an emblem according to a first embodiment.

As shown in FIGS. 1 and 2, the decorative main body 16 includes a front base 17, a rear base 21, a coupling portion 24, and a decorative layer 25. The decorative main body 16 substantially has the shape of an oval plate as a whole and is gently curved to bulge forward.

Figure 4:
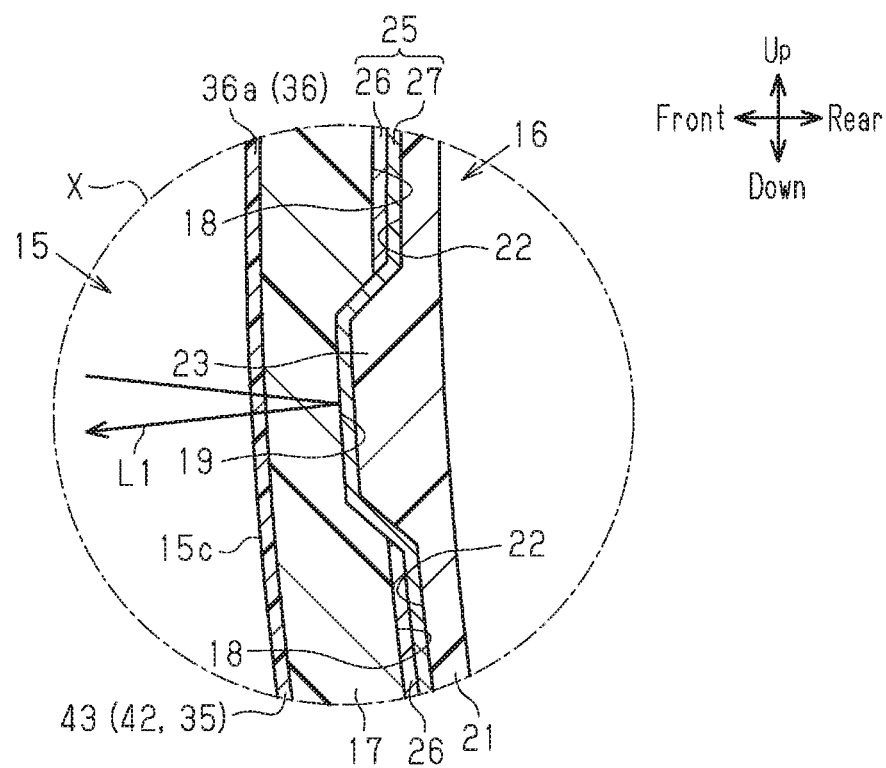
FIG. 4 is an enlarged partial cross-sectional view showing section X in FIG. 2.

As shown in FIGS. 2 and 4, the front base 17 is a component that constitutes the front part of the decorative main body 16. The front base 17 is made of a transparent plastic such as polycarbonate (PC) plastic, which has a low dielectric loss tangent (an index value of loss-rate of electric energy in a dielectric body). The dielectric loss tangent of PC plastic is 0.006. If the dielectric loss tangent is low, the millimeter waves 14 are unlikely to be converted into thermal energy, limiting the attenuation of the millimeter waves 14.

The rear part of the front base 17 includes a general portion 18, which is substantially orthogonal to the front-rear direction, and a recess 19, which is recessed forward with respect to the general portion 18. The general portion 18 corresponds to a background area 15a of the emblem 15 in FIG. 1, and the recess 19 corresponds to a pattern area 15b of the emblem 15. In the present embodiment, the pattern area 15b is constituted by a letter A and an annular portion surrounding the letter A. The front base 17 is made of polymethacrylic acid methyl (PMMA) plastic, which has a low dielectric loss tangent like the above-described PC plastic.

As shown in FIGS. 2 and 4, the rear base 21 is a component that constitutes the rear part of the decorative main body 16. The rear base 21 is made of a colored plastic such as acrylonitrile-ethylene-styrene copolymer (AES) plastic, which has a low dielectric loss tangent. The dielectric loss tangent of AES plastic is 0.007, and the relative permittivity of AES plastic is substantially equal to that of PC plastic. The front part of the rear base 21 is formed to have a shape corresponding to the shape of the rear part of the front base 17. That is, the rear base 21 has a general portion 22, which is substantially orthogonal to the front-rear direction, at the front part in a section behind the general portion 18 of the front base 17. The rear base 21 also has a protrusion 23, which protrudes with respect to the general portion 22, in a section behind the recess 19 of the front base 17.

In place of AES plastic, the rear base 21 may be made of a plastic of which the relative permittivity is close to that of the front base 17, for example, acrylonitrile styrene acrylate (ASA) plastic, PC plastic, and polycarbonate/acrylonitrile butadiene styrene (PC/ABS) plastic.

The coupling portion 24 is provided along the outer circumference of the decorative main body 16 and has the shape of an oval loop. The coupling portion 24 is made of black plastic that is a mixture of PC plastic and carbon black. The coupling portion 24 is welded to the front base 17 and the rear base 21 to couple the front base 17 and the rear base 21 to each other.

The decorative layer 25 is provided in an area between the front base 17 and the rear base 21 surrounded by the coupling portion 24 and has a millimeter wave transparency. The decorative layer 25 is composed by combining a colored decorative layer 26, which is, for example, black or blue, and a luster decorative layer 27, which has a metallic luster. The colored decorative layer 26 is provided on the rear surface of the general portion 18, for example, through printing such as screen printing or hot stamping.

The luster decorative layer 27 is formed by subjecting the entire wall surface of the recess 19 of the front base 17 and the entire rear surface of the colored decorative layer 26 to sputtering or vapor-deposition with a metal material such as indium (In), such that the luster decorative layer 27 has an island structure. The island structure refers to a structure in which no single film covering the entire surface is provided, and a great number of slightly separated or partly contacting island-like metal films are spread over the surface. Due to the island structure, the luster decorative layer 27 has a discontinuous structure and thus has a high electrical resistance and a millimeter wave transparency.

The area in the decorative main body 16 through which millimeter waves pass has a uniform thickness in the front-rear direction.

The decorative main body 16 has attachment portions (not shown) for attaching the decorative main body 16 disposed in the window 12 to the front grille 11 at several positions in the rear peripheral portion. The attachment portions are constituted, for example, by clips, screws, or engaging hooks.

As shown in FIG. 2, a circuit board (printed circuit board) 32 is provided behind the lower part of the decorative main body 16. The circuit board 32 is connected to the power source (not shown) of the vehicle 10. The circuit board 32 has power wires (not shown). The power wires constitute part of an electricity supplying path for supplying electricity to a heating wire 37 via connection portions 41 (see FIG. 3A) in the heating sheet 35, which will be discussed below.

<Heating Sheet 35>

Figure 3A:
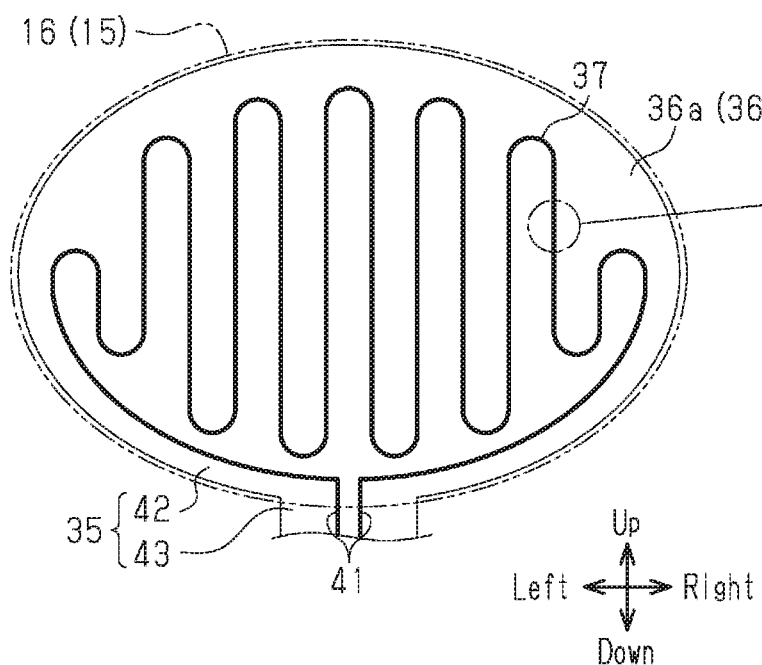
FIG. 3A is a partial rear view of a heating sheet according to the first embodiment.
Figure 3B:
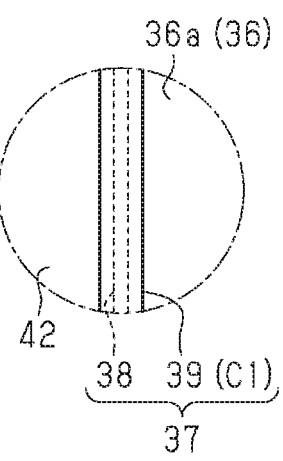
FIG. 3B is an enlarged partial rear view illustrating a part of FIG. 3A.

As shown in FIGS. 3A and 3B, the heating sheet 35 includes a sheet 36, the heating wire 37, and a pair of connection portions 41. The sheet 36 is made of a transparent plastic having a millimeter wave transparency, such as PC plastic. The heating wire 37 and the two connection portions 41 are routed in the sheet 36.

Figure 5:
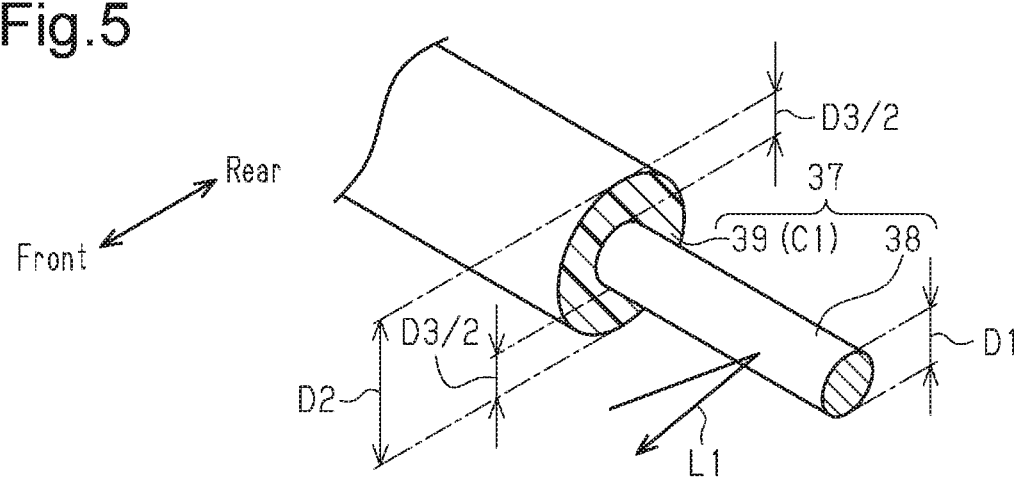
FIG. 5 is a partial perspective cross-sectional view of the heating wire according to the first embodiment.

As shown in FIGS. 3B and 5, the heating wire 37 is constituted by a lead 38 and a plastic coating portion C1. The lead 38 is made of a metal material that generates heat when energized. The plastic coating portion C1 coats and protects the lead 38. The lead 38 is a solid wire. At least the outer circumferential portion of the coating portion C1 is constituted by a transparent coating portion 39, which is made of colorless transparent plastic. In the first embodiment, the entire coating portion C1 is constituted by the transparent coating portion 39.

The lead 38 preferably has a lead diameter D1 less than or equal to 20 μm. There is no limit to the minimum value of the lead diameter D1. That is, the smallest diameter that can be formed corresponds to the minimum value. The value obtained by subtracting the lead diameter D1 of the lead 38 from the diameter D2 of the coating portion C1 is referred to as a coating diameter D3 of the coating portion C1. The coating diameter D3 is preferably set to 30 μm or greater. There is no limit to the maximum value of the coating diameter D3. Since the coating portion C1 is transparent, the appearance is not particularly degraded even if the coating diameter D3 is great. In FIG. 5, half the coating diameter D3 (D3/2) is shown on either side of the lead 38 in the radial direction of the heating wire 37.

In the first embodiment, the lead 38 is made of copper. The lead diameter D1 of the lead 38 is set to 20 μm, the coating diameter D3 of the coating portion C1 is set to 30 μm. Therefore, the diameter of the whole heating wire 37, in this case, the diameter D2 of the coating portion C1 is 50 μm.

As shown in FIG. 3A, the connection portions 41 are made of a conductive metal material and connected to the opposite ends of the heating wire 37.

The heating sheet 35 includes a heating main body 42 and an extending portion 43. The heating main body 42 substantially has the shape of a horizontally elongated oval plate that has the same shape as the decorative main body 16. The heating wire 37 is routed in the heating main body 42 by being repeatedly bent in a wavy manner Although not illustrated, the sheet 36 of the heating main body 42 may be constituted by a pair of front and rear sheet members 36a, and the heating wire 37 may be routed between the sheet members 36a. In this case, the heating wire 37 is routed on the rear surface of the front sheet member 36a. Also, although not illustrated, the sheet 36 of the heating main body 42 may be constituted by a single sheet member 36a, and the heating wire 37 may be routed on the rear surface of the sheet member 36a. In either case, a part of or the entirety of the sheet member 36a is located forward of the heating wire 37 in the heating main body 42.

As shown in FIG. 4, the heating main body 42 is arranged in front of the decorative main body 16. The heating main body 42 is fixed to the decorative main body 16 by being bonded to the front surface of the front base 17. The front surface of the heating main body 42 constitutes a design surface 15c of the emblem 15.

As shown in FIG. 3A, the extending portion 43 extends downward from the lower end of the heating main body 42. The connection portions 41 are routed in the extending portion 43. As shown in FIG. 2, the extending portion 43 is bent along the lower surface and the rear surface of the decorative main body 16 so as to wrap around the back of the decorative main body 16 via the lower end. The connection portions 41 in the bent extending portion 43 are electrically connected to the power wires of the circuit board 32 behind the decorative main body 16. FIG. 3A illustrates only part of the extending portion 43 before being bent.

As shown in FIG. 4, in the emblem 15 having the above descried configuration, the sheet 36 of the heating main body 42 is located in the area from the design surface 15c to a position behind and separated from the design surface 15c. The sheet member 36a that is located forward of the heating wire 37 in the sheet 36 corresponds to the "transparent member" in the section of "WHAT IS CLAIMED IS."

The emblem 15 is disposed in the window 12 while being upright and attached to the front grille 11 at the attachment portions.

Operation of the first embodiment, which is configured as described above, will now be described. Advantages that accompany the operation will also be described.

When the millimeter wave radar device 13 transmits millimeter waves 14, the millimeter waves 14 pass through the rear base 21, the decorative layer 25, and the front base 17 of the decorative main body 16, and the heating main body 42 of the heating sheet 35 in order as shown in FIGS. 2 and 4. After passing through the components, the millimeter waves 14 hit and are reflected by an object in front of the vehicle, such as a leading vehicle or a pedestrian, and then pass through the heating main body 42, the front base 17, the decorative layer 25, and the rear base 21 in order. The millimeter waves 14 are received by the millimeter wave radar device 13. Based on the transmitted and received millimeter waves 14, the millimeter wave radar device 13 recognizes the object and detects the distance between the vehicle 10 and the object and the relative velocity.

The emblem 15, which is constituted by the decorative main body 16 and the heating sheet 35, each having a millimeter wave transparency, is unlikely to hinder passing of the transmitted and reflected millimeter waves 14. The amount of a part of the millimeter waves 14 that is attenuated by the emblem 15 is limited to a permissible range. This allows the millimeter wave radar device 13 to properly exert functions such as the detecting function described above.

When ice and snow collect on the design surface 15c of the emblem 15, electricity from the power source is supplied to the heating wire 37 via the power wires of the circuit board 32 and the connection portions 41. The heating wire 37 is thus energized to generate heat. Some of the heat generated by the heating wire 37 is transferred to the design surface 15c of the emblem 15. The transferred heat melts the ice and snow collected on the design surface 15c of the emblem 15, thereby limiting the attenuation of the millimeter waves 14 due to ice and snow. Particularly, in the first embodiment, the heating main body 42 is disposed in front of the decorative main body 16. In other words, the heating wire 37 is disposed at the foremost part of the emblem 15 and close to the design surface 15c. This allows the heat generated by the heating wire 37 to be readily transferred to the design surface 15c of the emblem 15, so that ice and snow are melt efficiently.

FIGS. 2 and 4 illustrate a case in which the emblem 15 is irradiated with visible light L1 from the front. In this case, in sections where the heating wire 37 is absent, some of the visible light L1 passes through the sheet 36 of the heating main body 42 and the front base 17 in order before being reflected by the decorative layer 25.

In the sections where the heating wire 37 is routed, some of the visible light L1, with which the emblem 15 is irradiated from the front, passes through the sheet 36, the transparent coating portion 39, and the front base 17 in order before being reflected by the decorative layer 25.

Thus, when the emblem 15 is seen from the front, the decorative layer 25 appears to be located behind (on the far side of) either the sheet 36 and the front base 17 or the sheet 36, the transparent coating portion 39, and the front base 17 through these components. The color of the colored decorative layer 26 of the decorative layer 25 is visible. The luster decorative layer 27 of the decorative layer 25 appears to be glittering like metal. The decorative layer 25 thus decorates the decorative main body 16, improving the appearance of the emblem 15 and the surrounding portion.

Particularly, the decorative layer 25 is provided between the front base 17 and the rear base 21 and is uneven. Thus, from the front of the emblem 15, the luster decorative layer 27 appears to be located forward of (on the near side of) the colored decorative layer 26. This further improves the appearance of the emblem 15 and the surrounding portion.

The front grille 11 may include a plastic base with a plating layer on the surface. In this case, the color that is reflected by the luster decorative layer 27 and has metallic luster is matched with the color of the plating layer. The emblem 15 and the front grille 11 thus have a consistency. This improves the design of the front part of the vehicle 10.

The reflection of the visible light L1 on the decorative layer 25 shown in FIGS. 2 and 4 occurs at a position forward of the millimeter wave radar device 13. The decorative layer 25 exerts the function of concealing the millimeter wave radar device 13. Accordingly, the millimeter wave radar device 13 cannot be seen easily from the front of the emblem 15. The appearance is thus improved as compared with a case in which the millimeter wave radar device 13 can be seen through the emblem 15.

In the sections where the heating wire 37 is routed, some of the visible light L1, with which the emblem 15 is irradiated from the front, passes through a part of the sheet 36 of the heating main body 42, more specifically, through the sheet member 36a, which is located forward of the heating wire 37.

At this time, if at least the outer peripheral portion of the coating portion C1 in the heating wire 37 is constituted by a colored coating, the visible light L1 is reflected by the outer circumferential portion of the coating portion C1. When the emblem 15 is seen from the front, the entire heating wire 37, in this case, the coating portion C1, is visually recognized.

In contrast, the coating portion C1 is constituted solely by the transparent coating portion 39 in the first embodiment, and the lead 38 is inside and adjacent to the transparent coating portion 39. As shown in FIG. 5, the visible light L1 passes through a part of the transparent coating portion 39 (a part forward of the lead 38) before being reflected by the lead 38.

Thus, the part of the heating wire 37 except the transparent coating portion 39, in this case, the lead 38 is visually recognized. The size of the part of the heating wire 37 that is visually recognized is reduced by the size of the coating portion C1. The heating wire 37 is thus difficult to see as compared with a case in which at least the outer circumferential portion of the coating portion C1 is constituted by a colored coating portion.

If only the outer circumferential portion of the coating portion C1 is constituted by the transparent coating portion 39, the member that is inside and adjacent to the transparent coating portion 39 is visually recognized. However, the lead 38, which is visually recognized in the first embodiment, has a smaller diameter than that of the member that is located inside and adjacent to the transparent coating portion 39 in a case in which only the outer circumferential portion of the coating portion C1 is constituted by the transparent coating portion 39. Thus, as compared to such a case, the heating wire 37 is difficult to see. This configuration limits deterioration of the appearance of the emblem 15 due to the heating wire 37 being visible.

In addition, the lead 38, which has the lead diameter D1 less than or equal to 20 μm, is generally difficult to see. Thus, coupled with the fact that the coating portion C1 is constituted solely by the transparent coating portion 39, the heating wire 37 is further difficult to see. This configuration further effectively limits deterioration of the appearance of the emblem 15.

Figure 6:
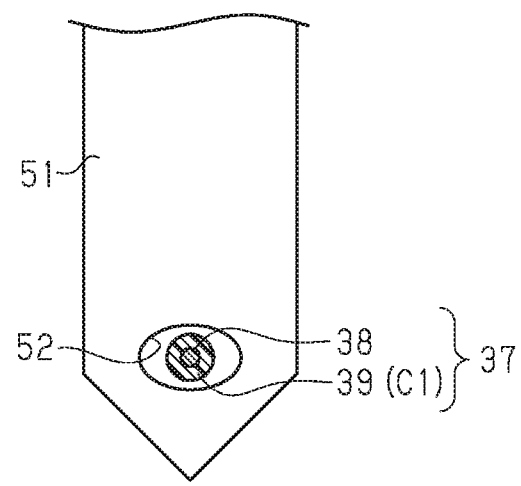
FIG. 6 is an explanatory diagram illustrating the relationship between the heating wire and a part of a processing machine used to route the heating wire in the first embodiment.

Further, since the lead 38 is coated with the coating portion C1, which has the coating diameter D3 larger than or equal to 30 μm, the lead 38 is properly protected by the coating portion C1. Thus, the lead 38 is unlikely to be broken when the heating wire 37 is routed. Specifically, when manufacturing the heating sheet 35 by routing the heating wire 37 in the sheet 36, a processing machine 51, a part of which is shown in FIG. 6, is used. The processing machine 51 has a feeder hole 52 in the distal end, through which the heating wire 37 is fed to the sheet 36 of the heating sheet 35. During the feeding process, if the coating diameter D3 of the coating portion C1 and the diameter D2 are small, the heating wire 37 shifts in the radial direction inside the feeder hole 52, which may break the lead 38. Also, since the heating wire 37 is fed while moving in the radial direction in the feeder hole 52, the routing accuracy of the heating wire 37 may be reduced.

In this regard, if the coating diameter D3 of the coating portion C1 is larger than or equal to 30 μm, the diameter D2 is large, and the heating wire 37 is fed while being restricted from moving in the radial direction in the feeder hole 52. The lead 38 is thus unlikely to be broken. This limits reduction in the routing accuracy due to the lead 38 moving in the radial direction in the feeder hole 52.

Second Embodiment

A vehicle decorative component according to a second embodiment will now be described with reference to FIG. 7, in addition to FIGS. 2 and 4.

The second embodiment is the same as the first embodiment in that, as shown in FIGS. 2 and 4, the decorative main body 16 includes the front base 17, which is made of a transparent plastic, and the decorative layer 25, which is formed on the rear surface of the base 17, and that the heating wire 37 is located forward of the decorative layer 25. Also, the second embodiment is the same as the first embodiment in that the heating sheet 35 is arranged forward of the decorative main body 16 and that a part of or the entirely of the sheet member 36*a* is located forward of the heating wire 37.

In the first embodiment (refer to FIG. 5), the entire coating portion C1 is constituted by the transparent coating portion 39. The second embodiment is different from the thus configured first embodiment in that the coating portion C1 has a colored coating portion 40 made of plastic on the inner circumference of the transparent coating portion 39. The transparent coating portion 39 constitutes the outer circumferential portion of the coating portion C1, and the colored coating portion 40 constitutes the inner circumferential portion of the coating portion C1. The colored coating portion 40 coats the lead 38, and the transparent coating portion 39 coats the colored coating portion 40. The lead diameter D1 of the lead 38 and the diameter D2 and the coating diameter D3 of the coating portion C1 are the same as those in the first embodiment. Further, the colored coating portion 40 has a color that is closer to the color of the decorative layer 25 (the color of the colored decorative layer 26 or the color of the luster decorative layer 27) than to the color of the lead 38.

The configuration other than the above is similar to the first embodiment. Thus, the same components as those in the first embodiment are given the same reference numerals, and detailed explanations are omitted.

The second embodiment thus achieves the same operations and advantages as the first embodiment. The second embodiment further achieves the following operations and advantages.

FIGS. 2 and 4 illustrate a case in which the emblem 15 is irradiated with visible light L1 from the front. In this case, in sections where the heating wire 37 is absent, some of the visible light L1 passes through the sheet 36 of the heating main body 42 and the front base 17 of the decorative main body 16 in order before being reflected by the decorative layer 25.

In the sections where the heating wire 37 is routed, some of the visible light L1, with which the emblem 15 is irradiated from the front, passes through the sheet 36, the transparent coating portion 39, and the front base 17 in order before being reflected by the decorative layer 25.

Thus, when the emblem 15 is seen from the front, the decorative layer 25 appears to be located behind (on the far side of) either the sheet 36 and the front base 17 or the sheet 36, the transparent coating portion 39, and the front base 17 through these components.

If the coating portion C1 is constituted only by the transparent coating portion 39, the lead 38 is visually recognized. Depending on the relationship between the color of the lead 38 and the color of the decorative layer 25, the lead 38 may be conspicuous. Specifically, if the lead 38 and the decorative layer 25 have significantly different colors, the lead 38 may be conspicuous.

Figure 7:
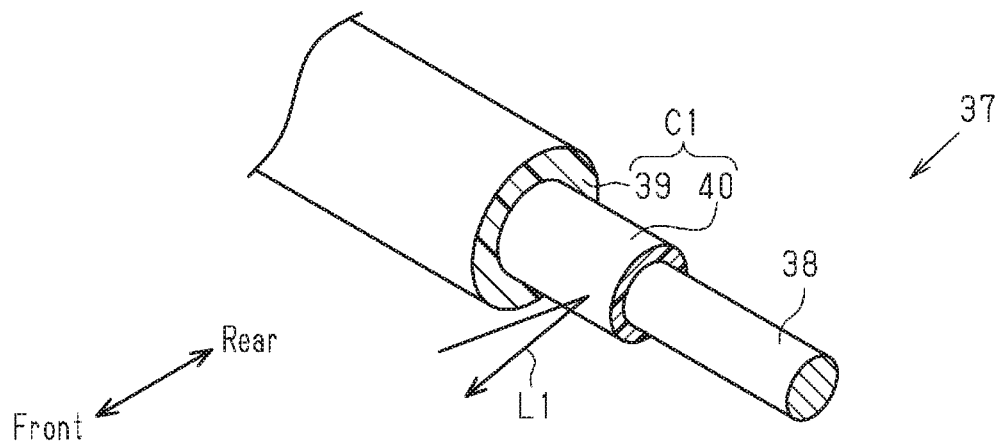
FIG. 7 is a partial perspective cross-sectional view of a heating wire according to a second embodiment.

In this regard, according to the second embodiment, in the sections where the heating wire 37 is routed, some of the visible light L1, with which the emblem 15 is irradiated from the front, passes through the sheet member 36*a*, which is forward of the heating wire 37, and the part of the transparent coating portion 39 that is forward of the colored coating portion 40 before being reflected by the colored coating portion 40 (FIG. 7).

Thus, the part of the coating portion C1 except the transparent coating portion 39, that is, the colored coating portion 40, which is located inside and adjacent to the transparent coating portion 39, is visually recognized. The size of the part of the heating wire 37 that is visually recognized is reduced by the size of the transparent coating portion 39. Thus, in this case also, the heating wire 37 is difficult to see as compared with a case in which at least the outer circumferential portion of the coating portion C1 is constituted by a colored coating portion.

Further, in the second embodiment, the colored coating portion 40 has a color that is closer to the color of the decorative layer 25 than to the color of the lead 38. Thus, the heating wire 37 is difficult to see as compared with a case in which the coating portion C1 is entirely constituted by the transparent coating portion 39, and the lead 38 is visually recognized.

The above-described embodiments may be modified as follows. The above-described embodiments and the following modifications can be combined as long as the combined modifications remain technically consistent with each other.

<Regarding Emblem 15>

The emblem 15 may be a plate having a shape other than an oval shape.

The emblem 15, which is disposed in the window 12, may be attached to the vehicle body instead of the front grille 11.

<Regarding Heating Wire 37>

As long as the position of the heating main body 42 in the front-rear direction in the emblem 15 is forward of the decorative layer 25, the position of the heating main body 42 may be changed to a position different from the position forward of the decorative main body 16. That is, the heating main body 42 may be changed to a position in the middle of the decorative main body 16 in the front-rear direction.

For example, if the front base 17 is constituted by two members separated from each other in the front-rear direction, the heating main body 42 may be arranged between those members. In this case, the member of the front base 17 that is located forward of the heating wire 37 and the sheet member 36*a* that is located forward of the heating wire 37 in the sheet 36 correspond to the above-described transparent members.

The lead 38 may be made of any metal other than copper as long as it generates heat when energized.

The heating wire 37 may be routed as a component of the heating sheet 35 as in the first and second embodiments. However, the heating wire 37 may be routed in the decorative main body 16 without using the sheet 36.

<Other Modifications>

Transparent components of the emblem 15 other than the transparent coating portion 39 of the heating wire 37 may be either a colorless transparent component or a colored transparent component.

The above-described vehicle decorative components may be employed as a component that is disposed at a position different from the emblem and decorates a vehicle.

The device that transmits and receives electromagnetic waves to detect an outside object is not limited to a front monitoring device, but may be a rear monitoring device, a side monitoring device for the front part, or a side monitoring device for the rear part. In these cases, the vehicle decorative component is located forward of the device in the transmission direction of millimeter waves.

"Electromagnetic waves" in this description include radio waves such as the millimeter waves and lights such as infrared rays.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle decorative component comprising:
   a decorative main body provided in a vehicle equipped with a device configured to transmit and receive electromagnetic waves to detect an object outside the vehicle, the decorative main body being arranged in front of the device in a transmission direction of the electromagnetic waves to decorate the vehicle and having a transparency to the electromagnetic waves;
   a heating wire having a diameter; and
   a design surface on a front surface in the transmission direction, wherein
   an area from the design surface to a position behind and separated from the design surface in the transmission direction is constituted by a transparent member transparent to the electromagnetic waves,
   the heating wire is disposed on a rear surface of the transparent member in the transmission direction,
   the heating wire includes a metal lead, which generates heat when energized, and a coat made of plastic, the coat coating the lead and constituting an outer circumferential portion of the heating wire,
   the diameter of the heating wire corresponds to a diameter of the coat, and
      at least an outer circumferential portion of the coat is constituted by a transparent coat, which is made of a transparent plastic.

2. The vehicle decorative component according to claim 1, wherein the coat is constituted by only the transparent coat.

3. The vehicle decorative component according to claim 2, wherein the lead has a lead diameter less than or equal to 20 μm.

4. The vehicle decorative component according to claim 1, wherein
   the decorative main body includes
      a transparent base, and
      a decorative layer provided on a rear surface in the transmission direction of the base,
   the heating wire is disposed forward in the transmission direction of the decorative layer, and
   the coat has a colored coat on an inner circumference of the transparent coat.

5. The vehicle decorative component according to claim 1, wherein
   a value obtained by subtracting a lead diameter of the lead from the diameter of the coat is referred to as a coating diameter of the coat, and
   the coating diameter is set to 30 μm or greater.

* * * * *